Sept. 19, 1950 — V. DAHLMAN — 2,522,568
AUTOMATIC ELECTROSTATIC FILTER FOR FURNACES
Filed Oct. 18, 1946 — 3 Sheets-Sheet 1

INVENTOR
Verner Dahlman
BY Arthur H. Robert
ATTORNEY

INVENTOR
Verner Dahlman
BY
Arthur H Robert
ATTORNEY

Sept. 19, 1950 V. DAHLMAN 2,522,568
AUTOMATIC ELECTROSTATIC FILTER FOR FURNACES
Filed Oct. 18, 1946 3 Sheets-Sheet 3

INVENTOR.
Verner Dahlman
BY
Arthur F. Robert
ATTORNEY

Patented Sept. 19, 1950

2,522,568

UNITED STATES PATENT OFFICE 2,522,568

AUTOMATIC ELECTROSTATIC FILTER FOR FURNACES

Verner Dahlman, New Lenox, Ill., assignor to American Air Filter Company, Inc., Louisville, Ky., a corporation of Delaware Application October 18, 1946, Serial No. 704,063

12 Claims. (Cl. 183—7)

This invention relates to an electrical air filter, and more particularly to an electrical air filter for use with hot air furnaces and the like for filtering both the air recirculated by the system and any fresh air fed thereto.

It is well known that the mechanical air filters presently used with hot air furnaces and the like do not efficiently remove particles of microscopic size such as are exemplified by smoke particles. Furthermore, the average householder is not given to periodical inspections of such filters with the result that they oftentimes accumulate dust and dirt in excess of their capacity and actually function to feed the undesired particles back into the air stream in addition to obstructing the air flow. Such filters are usually of a type that must be bodily replaced, thus involving a considerable recurrent cost.

The need for a filter capable of removing small particles as are found in smoke and soot, capable of maintaining peak efficiency over a long period of time, and of a character suitable for domestic use as regards both operation and costs has long been recognized.

It is a major object of the present invention to provide such a filter, the filter disclosed herein being characterized by its simplicity, its high efficiency, its reliability, and its low cost of operation.

Another object of this invention is the provision of a domestic filter employing a disposable filter medium, novel means being provided whereby the used filter medium can be replaced by fresh medium as the necessity arises, thereby maintaining the filter at its maximum efficiency.

A further object of the invention is the provision of novel means for both supporting and imposing an electrostatic charge on a disposable dielectric filter medium.

Still a further object is the provision of a novel arrangement of dielectric filter medium and means for replacing the filter medium, as used, by fresh filter medium.

Other objects and advantages of the invention will appear from the following description and claims taken in connection with the attached drawings, wherein:

Figures 1, 2:
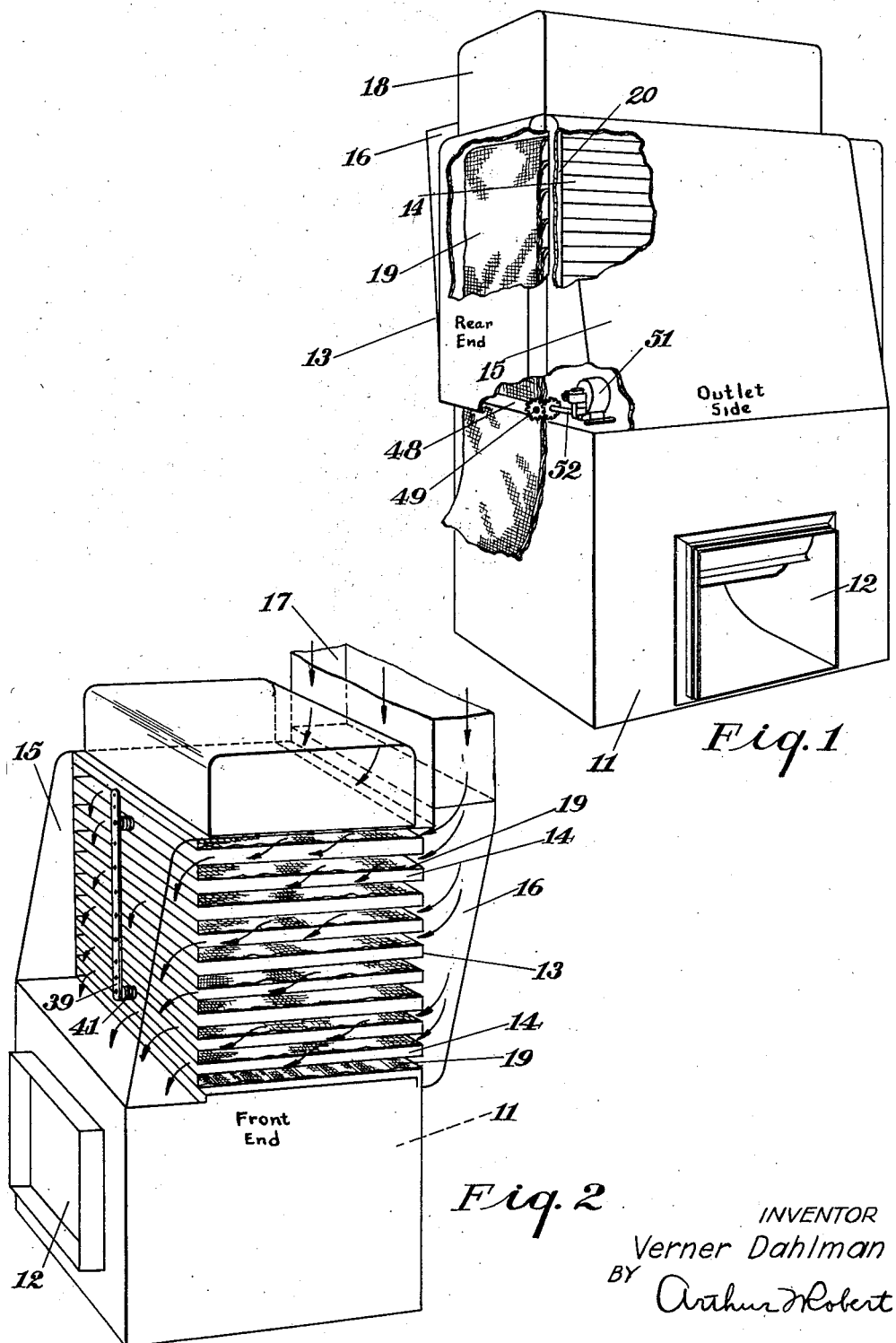
Fig. 1 is a perspective of view showing the front end and discharge side of a preferred embodiment of the invention.
Fig. 2 is a perspective view showing the rear end and discharge side of the same embodiment, with the elements shown somewhat diagrammatically and the filter medium moving means omitted.

Referring to Figs. 1 and 2, the filter shown therein includes a base housing 11, having a fan therein (not shown) arranged to discharge filtered air through an opening 12 into the inlet of a hot air furnace or the like; a filter chamber 13 containing a series of superimposed filter trays 14; an air discharge conduit 15 leading from one side of the filter chamber to the base housing; an air inlet conduit 16 connected to one side of the filter chamber and a conduit 17; and a top housing 18 for the power pack (not shown). Conduit 17 is preferably a part of the return of the hot air heating system, conventional controls and connections being provided therein so that the proportion of recirculated air and the amount of fresh air, if any, fed into the system may be controlled as desired. If the filter be added as a part of an existing hot air installation, already having a fan or blower to circulate the air, the fan in housing 11 may be omitted.

Each filter tray 14 is arranged to support a layer of filter medium 19 disposed thereacross, the two being substantially equal in size to the horizontal cross-sectional area of filter chamber 13. Each tray 14 (Figs. 4–6 incl.) is formed of a pan 21, preferably of metal capable of being easily fabricated as by stamping and spot-welding. As viewed in section in Fig. 6, each pan 21 is formed with a depending integral channel 22 at one side thereof and a smaller and upwardly extending integral channel 23 at the opposite side. A flanged member 24 is secured to channel 23 and arranged to define a small feed channel 25 at the air entrance side of the unit to receive and retain the edge of filter medium 19, member 24 being inclined at 26 (Fig. 5) to facilitate the feed of the medium therein. Member 24 protects the edge of the filter medium against being raised by the entering flow of air.

The ends of pan 21 (Fig. 5) are formed as upwardly extending angles 27 and 28, the flat upper surface of angle 27 serving as a feed surface for the filter medium and the curved upper surface of angle 28 serving as a discharge surface, the two surfaces being of substantial extent to engage the undersurface of the filter medium so that an effectual seal against by-passing of the air is secured. This seal is further assured by the tendency of the air flow to press the filter medium down against the surfaces.

Figure 4:
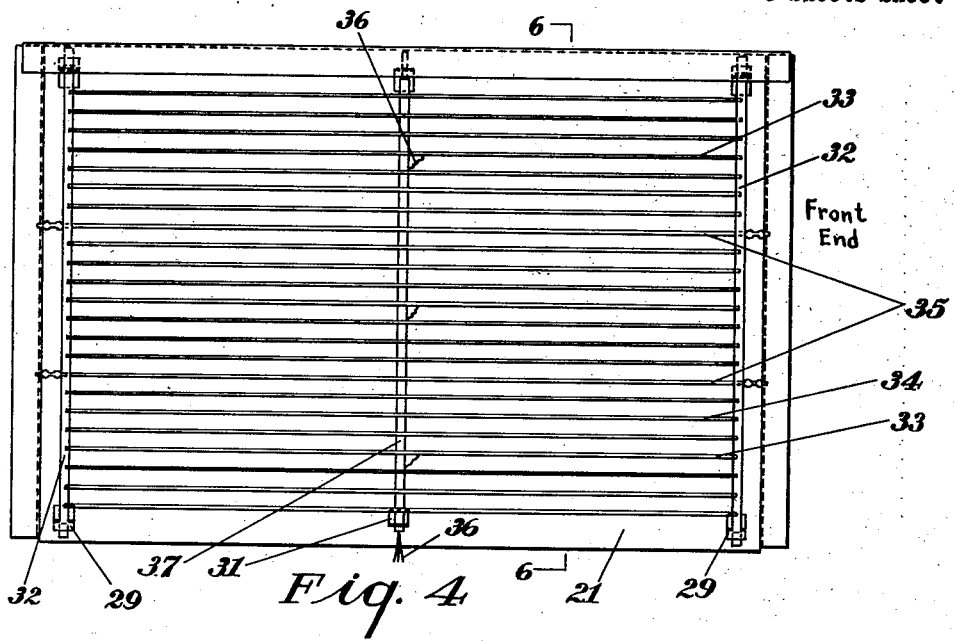
Fig. 4 is a plan of one of the supports or trays for the filter medium.
Figure 5:
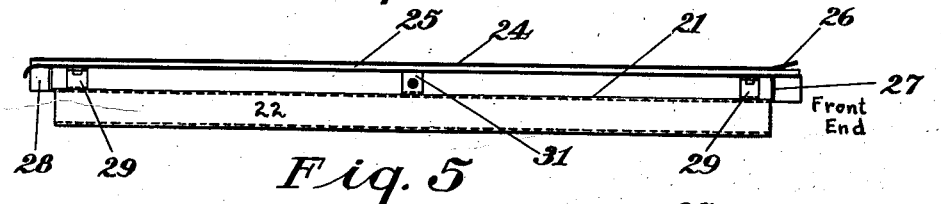
Fig. 5 is a side elevation of the tray of Fig. 4.

Opposed and paired upstanding brackets 29 and 31 are secured to pan 21 in the positions shown in Fig. 4, brackets 29 being apertured to receive and support rods 32 of a suitable dielectric material such as a mica-like material that is sold under the trade name "Formica." Each rod 32 is formed with spaced apertures to receive and support the ends of wires 33, 34 and 35 which form a grid for the support of the filter medium, that grid being spaced above the surface of pan 21.

Figure 7:
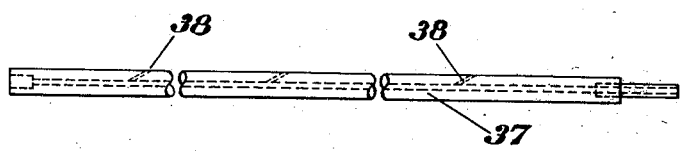
Fig. 7 is an elevation of the rod employed to impart an electrostatic charge to the grid of Fig. 4.

Wires 35 extend through rods 32 to electrical contact with end angles 27 and 28. Wires 33 are arranged to be connected to a source of electrical energy by leads 36 contained in a hollow insulating rod 37 of dielectric material (Fig. 7) supported in brackets 31 and formed with apertures 38 for the ends of leads 36 running to wire 33. Leads 36 are connected to a bus bar 39 (Fig. 2) supported on the discharge side of the filter section by insulators 41, the bus bar being connected to the power pack in any suitable manner.

By reason of the spacing of the wires 33 which are charged at about 12,000 volts D. C. and wires 35 which are preferably grounded through the supporting frame and housing, the dielectric filter medium is charged at different sections with electric potentials of opposite signs, the intermediate wires 34 serving as additional supports for the filter mediums.

Figure 6:
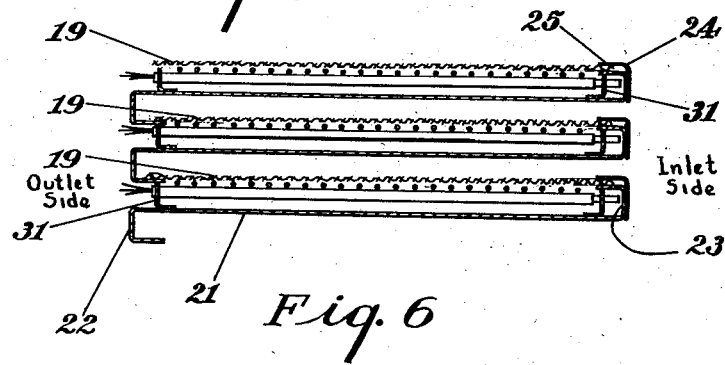
Fig. 6 is a section taken on the line 6—6 of Fig. 4, illustrating a number of the trays in their superimposed relation.

The manner in which the trays 14 are assembled in vertically superimposed relation to form filter section 13 is shown in Fig. 6. As will be noted, the tray bottoms with the grid and filter medium combinations spaced thereabove define a series of vertically superimposed compartments, alternate compartments being closed at their right sides by the vertical walls of channels 23 and the remaining or intermediate compartments being closed at their left sides by the vertical walls of channels 22. The proper spacing of the trays is insured by appropriate supports in the form of vertical legs or equivalent means 20 rising at the corners of the filter sections, the individual trays being spot-welded thereto or removably mounted on lugs formed on the legs. In the arrangement shown, the air to be filtered enters through the openings at the right side of the assembly, passes through filter mediums 19 and out through the openings at the left side defined by the spaced channels 22. Thus there is no possibility of the air by-passing the filter medium. At the same time, the available area of filter medium is of such a magnitude that the resistance to the air flow is minimized.

Figure 3:
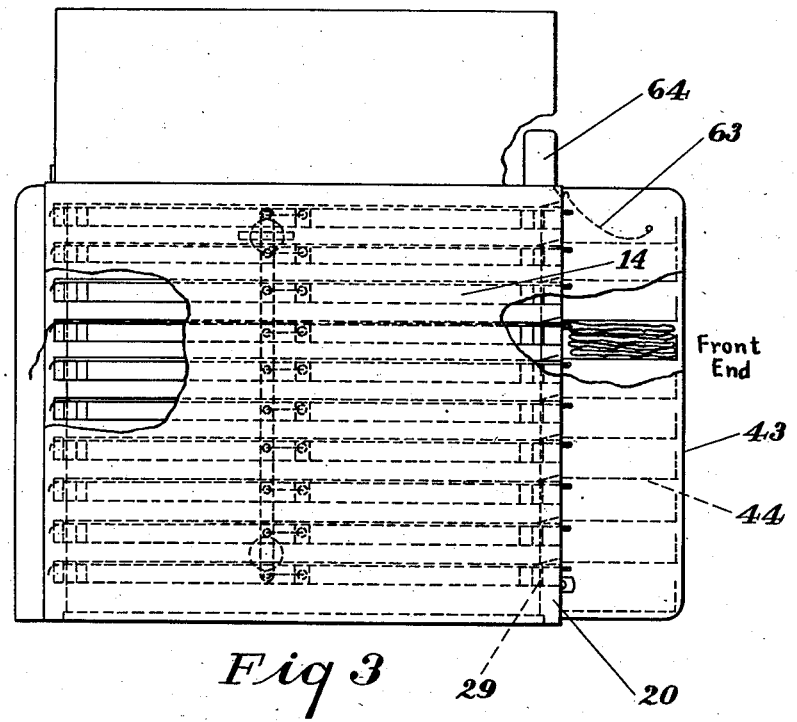
Fig. 3 is a front elevation of the filter chamber of the embodiment of Fig. 1, the advancing means for the filter sheets and the sheets being omitted except on one tray.

A filter medium storage chamber (Fig. 3) is provided at one side of filter section 13, the chamber being defined by a removable air tight housing 43 and containing a series of vertically spaced shelves 44, one shelf being provided for each tray 14 and positioned so that the filter medium thereon can be fed directly across the upper face of angle 27 onto and across the grid.

After the filter has been in operation for some time, the filter medium becomes dirty and offers such a resistance to the flow of air therethrough as to reduce seriously the circulation of the air. Dirty filter medium must then be withdrawn and replaced by fresh medium. In such a case, it is desirable that all the filter mediums be replaced in equal amount so that the resistances of all will be substantially equal and there will be no tendency for more air to flow through one medium than another. To that end, a pair of spring-pressed rollers 48 (Fig. 1) are mounted in the housing so that all the sheets of filter medium on the discharge side of the trays can be engaged therebetween. Thus by rotating one of the rollers, the two being preferably connected by gears 49, all the sheets of filter medium may be advanced from the storage chamber in equal amount. Rollers 48 may be corrugated, faced with soft rubber or similarly formed to adequately grip the filter mediums.

Rollers 48 may be arranged to be rotated directly by hand or they may be connected to a motor 51 through a speed reduction mechanism 52 for operation by the motor.

Figure 8:
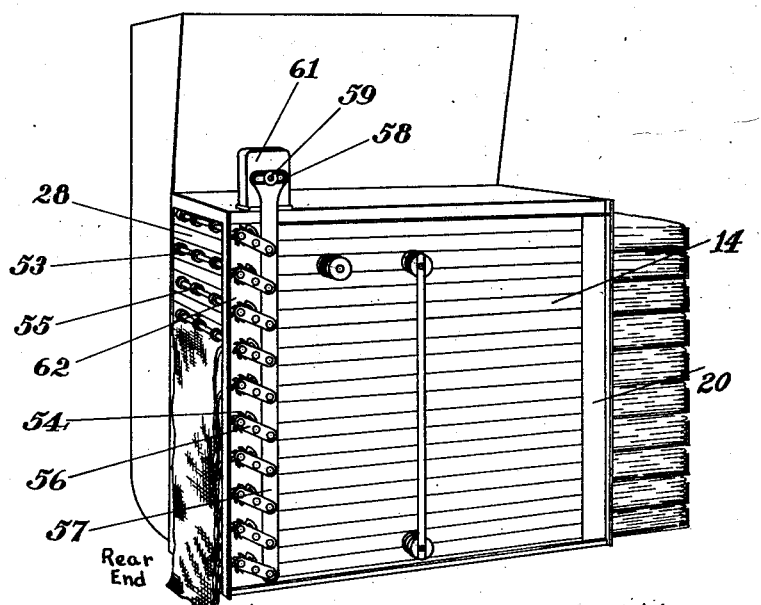
Fig. 8 is a perspective of a modified form of feeding device wherein each layer of filter medium is contacted by a separate feed roller.

In Fig. 8, a modified feed means is shown wherein a shaft 53 is rotatably mounted in the housing adjacent the discharge end of each filter tray, the end of each shaft carrying a ratchet 54 arranged to rotate therewith. Each shaft has a plurality of frictional elements such as rubber bushings 55 secured thereon, and arranged in conjunction with the upper surface of angle 28, to engage the filter medium and cause it to move when the shaft is rotated.

A series of pawl supporting arms 56 are rotatably mounted at one end to the ratchet ends of shafts 53 and pivotally secured to a connecting rod 57 at their opposite ends, the latter being formed with a slot 58 at its upper end arranged to receive an eccentric 59 on the shaft of a motor 61. Each pawl arm carries a pawl 62 arranged to engage the corresponding ratchet 54. Thus when motor 61 is operated to cause connecting rod 57 to reciprocate vertically, pawls 62 engage ratchets 54 in their clockwise movement to rotate shafts 53 and cause the sheets of filter medium to be withdrawn from the filter chamber.

While electric motors 51 and 61 may be manually actuated, automatic controls of the type disclosed in the copending application of Arthur Nutting and Robert A. Palmore, Serial No. 709,408 filed November 2, 1946 (now abandoned) may be used for their control.

To insure attention and replacement when all the medium is expended, a hinged weighted contact member 63 is provided on any of the shelves and connected to an electrical switch 64 so that when the filter medium on that shelf is exhausted, an electrical indication such as a light, buzzer, or the like will be actuated. Or the switch 64 may be connected to shut off the fan.

Such a control is required on only one shelf since as already explained, the replacement of used filter medium through the filter chamber is substantially uniform, and an indication of the supply on any one shelf is an accurate indication of the supplies on the other shelves.

The filter of this invention has been found to be extremely efficient and reliable in a hot air heating system. By the accepted discoloration method of test, it has demonstrated an efficiency of from 50% to 60% for a single passage of air as compared to about 5% for the typical furnace filter, particles of microscopic size such as soot and smoke being efficiently removed. As the air is recirculated through the filter a number of times, the net result is air cleaned to a degree that has been hitherto considered impossible in household use.

The dielectric filter medium preferably employed is of the low cost, disposable type such as that disclosed in Patent 1,897,976 of February 14, 1935 i. e., a paper medium composed of a plurality of superimposed, separable layers of sheet-like fibrous material network of short-fibered pulp, characterized by a multitude of fine "air strainer" openings. However other dielectric mediums such as felt, woven cloth or like material may be used and dry cleaned, washed or otherwise processed to return it to a serviceable condition. The capacity of the storage chamber is preferably such that it will contain sufficient medium for an entire heating season.

Having described my invention, I claim:

1. A supporting assembly for an air filter of the electrostatic type wherein the assembly functions to support a filter medium of dielectric material in the path of air flow, comprising: a tray-like support; a grid formed of a plurality of electrical conductors; dielectric means to support said grid on said tray in spaced relation to the bottom thereof; and means to connect certain grid conductors, forming one set, to one side of a source of electrical potential and connect certain other grid conductors, forming another set to another side of said source of electrical potential so as to charge said filter medium accordingly.

2. The supporting assembly of claim 1 wherein a bored rod of dielectric material is arranged to support a portion of the grid, and leads are provided therein and connected to one of said sets of grid conductors.

3. An air filter for use with a hot air heating system or the like, comprising: a housing having an air inlet section at one side, an air outlet section at its opposite side and a filter section therebetween; a plurality of filter supports superimposed in spaced relation within the filtering section to define a series of compartments, certain of said compartments being open at the inlet side and closed at the outlet side and alternate compartments being closed at the inlet side and open at the outlet side; a sheet-like filter medium supported in each compartment in the path of air flow therethrough; means at one end of each compartment to support a supply of said filter medium; and means at the opposite end of each compartment for pulling used filter mediums from the compartments and fresh filter mediums into the compartments.

4. An air filter for use with a hot air heating system or the like for filtering the air flow therethrough, comprising: a filter section having an air inlet side and an air outlet side; a series of filter medium supports disposed in said section in superimposed spaced relation and arranged to define filtering compartments which are open along the upper portion of one side margin and along the lower portion of the opposite side margin, said open portions providing air inlets on one side and air outlets on the other; a sheet-like filter medium on each of said supports in the path of air flow; means to maintain a supply of fresh filter medium in the form of an extension of said sheets at one end of each of said filter supports; and means to draw the filter medium across said supports and transverse of the air flow to remove used filter medium and replace it with fresh filter medium.

5. An air filter comprising: a housing having front and rear ends and opposite sides with air inlet and outlet space sections, respectively adjacent its opposite sides, and a filter space section between inlet and outlet sections; a series of partitions horizontally dividing the filter section into a superposed series of separate compartments, each compartment being open at its front and rear ends and at opposite sides and having an upper air space and a lower air space, one being an air inlet space and the other an air outlet space; means along the side margins of each compartment for sealing the compartment air outlet space from the housing air inlet section and the compartment air inlet space from the housing air outlet section but leaving air free to pass from the housing air inlet section successively through the compartment inlet and outlet spaces into the housing outlet section; means providing side margin sealing surfaces along the opposite side margins of the division plane between the compartment inlet and outlet spaces; a filter medium supporting grid extending along the under side of the division plane of each compartment; means at the front end of the housing for supporting a series of long sheets of filtering material, one sheet for each compartment, each sheet being adapted to extend from the front end supply through its particular compartment in slideable contact with said grid and the side margin sealing surfaces and to project from the rear end of such compartment; and sheet moving means positioned to engage the projecting end of each sheet and operative when actuated to pull the engaged sheets horizontally through their respective compartments so as to introduce fresh filter medium into the front end thereof while withdrawing used medium from the rear end thereof.

6. The air filter of claim 5 wherein: the filter medium is of dielectric material; and means are provided to charge the compartment portion of the filter medium electrostatically.

7. An air filter comprising: a plurality of filter medium supports disposed across the path of air flow with each support arranged to support a separate sheet-like dielectric filter medium; means adjacent one end of said supports to maintain supplies of dielectric filter medium in the form of relatively long sheets with at least one individual sheet for each individual support; means adjacent the opposite end of each support for moving filter medium from said supply means across such support; and means to establish and maintain an electrostatic charge on the filter mediums extending over said supports.

8. The air filter of claim 7 wherein: each filter medium support includes an electrically conductive grid which frictionally engages the face of the filter medium on the support; and the charge maintaining means includes means for connecting said grid to an electric power supply.

9. The air filter of claim 7 wherein: each filter medium support includes a grid having electrically conductive elements positioned to engage the face of the filter medium on said support, some elements being of one electrical sign and other elements being of the opposite sign; and the charge maintaining means includes means for connecting said elements of opposite sign to opposite sides of an electric power supply.

10. An air filter comprising: a plurality of vertically spaced, horizontally disposed supports having front and rear ends and opposite side margins, each support being adapted to support a dielectric filter medium; a dielectric filter medium for each support; means cooperating with each support to form an air inlet along one of its side margins and an air outlet along its opposite side margin and to constrain a stream of air, in flowing from said inlet to said outlet to pass through the filter medium supported by said support; and means for establishing and maintaining an electrostatic charge on the filter medium extending over each support.

11. An air filter comprising: a plurality of vertically spaced, horizontally disposed grids having front and rear ends and opposite side margins, each grid being adapted to support a sheet-like dielectric filter medium extending from its front end to its rear end; a dielectric filter medium for each support; means cooperating with each grid to form an air inlet along one of its side margins and an air outlet along its opposite side margin and to constrain a stream of air in flowing from said inlet to said outlet to pass through the grid, and the filter medium supported thereby; and means for introducing fresh dielectric filter medium to the front end of each support while removing used filter medium from the rear end thereof.

12. The air filter of claim 11 including: means for establishing and maintaining an electrostatic charge on the filter medium extending over each support.

VERNER DAHLMAN.

REFERENCES CITED

The following references are of record in the file of this patent:

UNITED STATES PATENTS

| Number | Name | Date |
|---|---|---|
| 1,900,476 | Wittemeier | Mar. 7, 1933 |
| 1,982,639 | Christofferson | Dec. 4, 1934 |
| 2,040,758 | Naugler | May 12, 1936 |

FOREIGN PATENTS

| Number | Country | Date |
|---|---|---|
| 468,084 | Great Britain | June 29, 1937 |
| 583,948 | France | Nov. 10, 1924 |
| 796,839 | France | Feb. 3, 1936 |